July 18, 1967 H. W. JOHNSON, JR 3,331,947

READING FREQUENCY-MODULATED TAPE RECORDS

Filed Oct. 31, 1962

INVENTOR:
HENRY WILSON JOHNSON, JR.
BY: Oswald H. Milmore
HIS ATTORNEY

United States Patent Office
3,331,947
Patented July 18, 1967

3,331,947
READING FREQUENCY-MODULATED TAPE RECORDS

Henry Wilson Johnson, Jr., Walnut Creek, Calif., assignor to Shell Oil Company, New York, N.Y., a corporation of Delaware Filed Oct. 31, 1962, Ser. No. 234,503
3 Claims. (Cl. 235—61.11)

The invention relates to the analysis of a signal recorded as a series of pulses of variable density along a tape, such as a magnetic tape or optical strip. A record of this type is herein for brevity called a frequency-modulated record in that it contains a series of signal elements—magnetic bits on a magnetic tape or dots or transverse lines of contrasting opacity on an optical tape—which occur at a frequency which is modulated to convey information.

The invention is applicable to a wide variety of signals representing different types of data, such as the output from a capillary or other gas-liquid chromatographic instrument (herein for brevity called a GLC unit), wherein the source signal is an electrical voltage representing the measurements made on the effluent stream of a property thereof, e.g., thermal conductivity measured in a thermal conductivity cell, the said signal increasing from a base amplitude (which may be zero) each time a component separated in the GLC unit passes through the cell. Such a source signal is often recorded by transforming the voltage to frequency and recording the frequency as a series of signal elements on a tape. One manner of making such a record is described in my copending patent application Ser. No. 77,554, filed Dec. 22, 1960, now abandoned.

In analyzing such a record the tape is played back in a recording device which includes a magnetic or optical reading head and the individual signal elements are counted, for example in the manner also described in the aforesaid prior patent application. To save time it is desirable to play back the tape at a high speed; however, the density of the signal elements along the tape length varies greatly, and the highest permissible play-back speed is limited by the greatest density encountered. These regions of very high signal density occur only at occasional intervals, and far higher speeds could be used for reading the intervening, low-density sections of the tape.

It is, therefore, an object of the invention to provide an improved method and apparatus for reading frequency-modulated tape records wherein the tape is transported past a reading head at a speed that is varied in accordance with the density of the signal elements or, stated otherwise, with the frequency at which the signal elements were initially recorded on the tape when the latter was moved at a constant speed.

A further problem in the analysis of records of the type described is that of providing a series of reference points along the tape which delimit equal time intervals in the source signal. Such reference points are necessary to permit the number of signal elements falling within each time period to be determined. While this could be effected by reading the tape at a linear speed bearing a known relation to the recording speed, this becomes impracticable when the tape is read at a variable speed. Placing time-signals at equal intervals along the tape for this purpose requires an added tape channel and the use of special equipment for generating, recording, and reading the time signals.

It is, therefore, an additional object of the invention to provide an improved method and apparatus for reading frequency-modulated tape records whereby time-interval signals representing equal lengths along the tape are generated without the need to record time signals on the tape.

Additional objects will become apparent from the following specification.

In summary, according to one feature of the invention the tape is read by moving it at a variable speed past a read head, generating a control signal representing the frequency at which the signal elements on the tape pass the read head, and controlling the linear speed of the tape in accordance with the said control signal. The control signal may be derived from the output signal of the reading head, although an auxiliary reading head may be provided. Further, the control may be such that the frequency at which pulses are emitted from the read head is essentially uniform; however, the invention is not restricted to this feature.

For generating time signals, a signal pulse generator is arranged to run synchronously to the capstan which drives the tape, be it a friction or a sprocket drive, e.g., either mechanically driven by the capstan itself or by some other mechanism or by the tape itself, and a time pulse is emitted each time a predetermined length of tape passes the read head. These time signals are then transmitted to a recorder, which may take the form of a counter, a computer or other unit in which the pulses are accumulated in suitable form to obtain a correlation between the number of signal elements and the time corresponding to the elapsed time in the source signal.

The invention will be further described with reference to the accompanying drawings forming a part of this specification and showing certain preferred embodiments, wherein.

Figure 1:
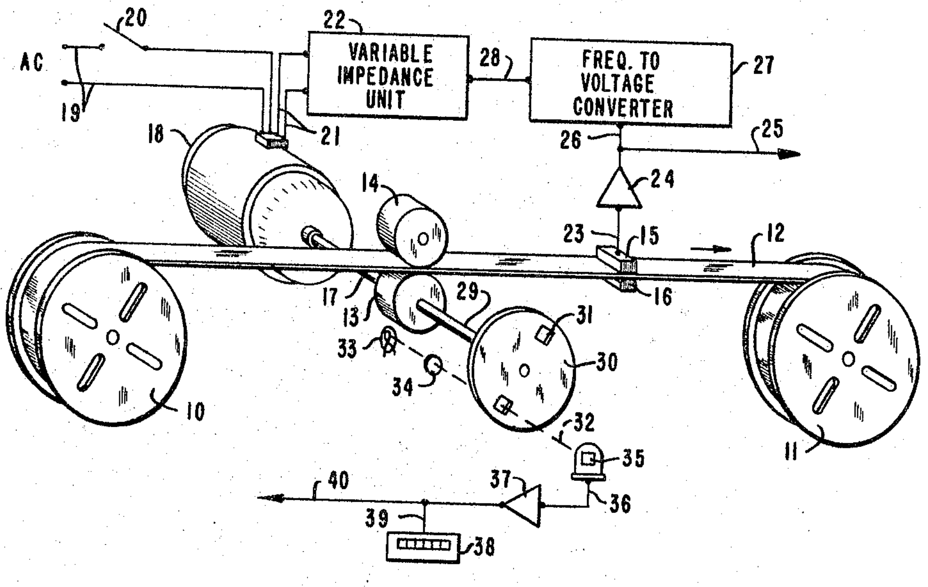
FIGURE 1 is a perspective view of a tape recording device constructed in accordance with the invention.

It will be understood that, in the drawings, most elements are shown diagrammatically inasmuch as the details of tape-handling mechanisms and read heads, as well as of the electrical components per se are well known in the art. Also, in many instances electrical circuits comprising a plurality of conductors are, for simplicity, represented by single lines.

Referring to FIGURE 1, the tape reader comprises a pair of storage reels 10 and 11, provided with suitable drive means, not shown, for transporting a magnetic tape 12 in the arrow direction. The tape passes between a capstan roll 13 and a counter-roll 14, the former having frictional contact with the tape for determining its movement. The tape further passes between a magnetic read head 15 and a back-up plate 16. The capstan is driven through a shaft 17 by a variable-speed drive mechanism of any suitable type, represented as a wound-rotor AC electric motor 18 connected to a power circuit 19 via a control switch 20. The armature winding thereof is connected by a circuit 21 to a variable impedance unit 22 which controls the speed of the motor by varying an impedance, in shunt with the field winding, e.g., as described for FIGURE 3.

The read head 15 is connected by a circuit 23 to an amplifier 24 and the amplified output—consisting of a series of electrical pulses—is transmitted via circuit 25 to the output; this may, for example, be connected to a computer or to a shift register or counter of a computer, as described in the aforesaid patent application. The amplified output is also fed via a branch circuit 26 to a frequency-to-voltage converter 27 of any suitable or known type which generates a control voltage determined by, e.g., proportional to the frequency of the pulses in the circuit 26. This control voltage is transmitted by a circuit 28 to the variable impedance unit 22. The unit 22 may, for example, be of the type which tends to maintain the control voltage at a fixed value. Thus, it will be understood that, for any given spacing of the signal elements on the tape, the frequency of the pulses in circuit 26 and, hence, the control voltage in the circuit 28 increase proportionally to the tape speed and with the density of the signal elements on the tape. The unit 22, by decreasing the impedance in shunt with the rotor upon a rise in the said control voltage, opposes an increase in the output frequency by reducing the motor and tape speed, and thereby reduces the control voltage. This may be reduced down to about its former level, but the invention is not restricted to an arrangement in which the control voltage and output frequency are held constant, it being within the purview of the invention to employ a converter 27 and/or a unit 22 which reduces the motor speed to any desired degree upon a rise in the output frequency. It is also possible to employ a control in which the motor speed is uniform up to a threshold level of the frequency and to reduce the motor speed in one or more steps as the frequency rises. It is evident that the opposite action occurs upon a fall in the output frequency.

The capstan 13 is further connected by a shaft 29 to an optical chopper 30 having one or more apertures 31, positioned to be in the path of a beam of light 32 directed by a lamp 33 and a lens 34 against a photocell 35. The latter has its output connected by a circuit 36 to an amplifier 37. A counter 38 is connected to the amplifier output by a circuit 39. It will be understood that the counter 38 may be connected to or be a part of a shift register by which the accumulated counts are fed to a computer, and that the pulses may be supplied by an output circuit 40 directly to a computer.

In operation the tape 12 is driven at high speed over sections thereof containing signal elements in the form of magnetic bits at a low density. When a peak or excursion occurs in the source signal—from which the tape record was made after conversion of the source signal to frequency—there occurs on the magnetic tape a region at which the signal elements are close together, often attaining a density of several hundred times that prevailing in the intervening tape section, the latter sections being often many times as long as the high-density sections. When such a high-density section of tape passes the read head 15 the output frequency in the circuit 26 and the control voltage in the circuit 28 rise, causing the unit 22 to decrease the impedance in the circuit 21 to slow the motor and capstan. This reduces the output frequency to a level which can be coped with by the read head and associated equipment. It was found that the decrease in the shunt impedance decreases the speed of the motor 18 with sufficient rapidity to take effect early upon the occurrence of a high-density tape section.

The photocell 35 receives a series of light pulses at a frequency proportional to the speed of the capstan and, hence, to the linear speed of the tape. Hence the electrical pulses in the circuit 39 demark equal distances along the length of the tape. Because such a tape is moved at constant speed when the record is made, these distances correspond to equal time intervals in the source signal. The pulses in the circuit 39 can, therefore, be fed via the circuit 40 to a computer to permit analysis of the record.

In practice, the arrangement according to the invention has made it feasible to operate the tape at speeds of from 50 to 100 inches per second over its low-density sections and quickly reduce the speed to about 3 to 40 inches per second when the tape contains about 10 to 100 signal elements per inch in the former sections and up to 1300 signal elements per inch in the high-density sections. This makes it possible to employ low-cost tape-reading equipment, in that costly elements for rapidly bringing the capstan to the designed operating speed and/or for maintaining a constant speed are not required.

Figure 2:
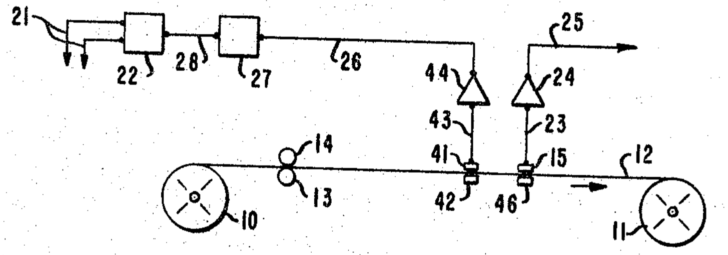
FIGURE 2 is a fragmentary elevation showing a modification.

It is also possible to employ an auxiliary read head for controlling the variable impedance unit. This variant is illustrated in FIGURE 2, wherein an auxiliary read head 41, cooperating with a back-up plate 42, is positioned to read the tape a small distance in advance of the principal read head 15. (The heads 15 and 41 may be parts of the same unit, spaced say one to four inches apart.) The read head 41 is connected by a circuit 43 to an amplifier 44 the output of which is connected to the frequency-to-voltage converter 27. This embodiment operates as was previously described with the difference that the lag in response of the motor 18 is compensated for by insuring that the control voltage is generated slightly earlier than the arrival of the signal elements at the principal read head 15.

Figure 3:
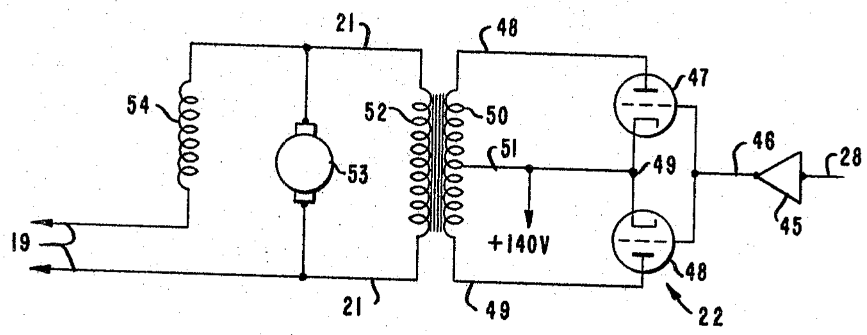
FIGURE 3 is a schematic diagram of a variable impedance unit applied to control the motor.

FIGURE 3 shows, by way of illustration, a specific variable impedance unit 22 which was used. It includes a D.C. amplifier 45, connected to the control voltage 28, to produce in the output circuit 46 a voltage which varies between 0 and +40 volts for the highest and for zero frequencies in the circuit 26, respectively. This signal is applied to the grids of a pair of triode vacuum tubes 47 and 48 (having heaters, not shown) the cathodes of which are interconnected by a circuit 49. The plates are connected by circuits 48 and 49 to one winding 50 of an impedance-matching transformer which has a center tap 51 tied to the circuit 49 and maintained at a bias of +140 volts. The other winding 52 is connected by the above-mentioned circuit 21 in shunt with the armature 53 of the motor 18, and field winding 54 being connected to the power supply 19 in series with the armature.

When the voltage in the circuit 46 is low the impedance is high and the motor 18 operates at full speed. As the voltage rises toward +140 volts the triodes conduct and the impedance is reduced, thereby slowing the motor.

I claim as my invention:

1. In apparatus for reading a tape carrying a frequency-modulated signal that forms a series of information signal elements unevenly spaced along the length thereof, the combination of:

(a) means for transporting said tape, including a rotatable capstan for advancing the tape at a speed determined by the capstan speed of rotation;

(b) a reading element for reading said information signal elements on the tape and generating a series of pulses corresponding to said information signal elements;

(c) a variable-speed electric motor for driving said capstan;

(d) means for generating a control signal representing the frequency at which said information signal elements pass the read head;

(e) a nulling circuit, said nulling circuit being coupled to the means for generating the control signal and including a push pull amplifier and an impedance-matching transformer, the secondary of said transformer being coupled to said electric motor to control the speed of the electric motor to maintain the amplitude of the control signal substantially constant.

2. In apparatus for reading a tape carrying a frequency-modulated signal that forms a series of information signal elements unevenly spaced along the length thereof, the combination of:

(a) means for transporting said tape, including a rotatable capstan for advancing the tape at a speed determined by the capstan speed of rotation;

(b) a reading element for reading said information signal elements on the tape and generating a series of pulses corresponding to said information signal elements;

(c) a variable-speed electric motor for driving said capstan;

(d) means for generating a control signal representing the frequency at which said information signal elements pass the read head;

(e) means for controlling the speed of said electric motor, said control signal being coupled to the control means of said electric motor to slow said transport means when the frequency at which said information signal elements pass the read head increases and to accelerate said transport means when it decreases; and (f) a means for measuring the linear travel of the tape and generating time signals at successive tape intervals.

3. The combination of claim 2 wherein the means for measuring the linear travel of the tape comprises:

(a) a source of light;

(b) a photocell positioned to be illumined by said source;

(c) a light chopper interposed optically between said source and cell and driven synchronously to said capstan;

(d) means connected to said cell for generating a series of electrical pulses in accordance with the interruptions of said light; and (e) means to record the said electrical pulses.

References Cited

UNITED STATES PATENTS

| | | | |
|---|---|---|---|
| 2,396,409 | 3/1946 | Berger | 179—100.2 |
| 2,678,821 | 6/1954 | Masterson | 179—100.2 |
| 2,697,754 | 12/1954 | Ranger | 179—100.1 |
| 2,977,422 | 3/1961 | Pear | 179—100.2 |
| 3,013,857 | 12/1961 | Muffly | 318—318 X |

FOREIGN PATENTS

| | | |
|---|---|---|
| 747,558 | 4/1956 | Great Britain. |

DARYL W. COOK, *Acting Primary Examiner.*

J. F. MILLER, G. MAIER, *Assistant Examiners.*